(No Model.)   3 Sheets—Sheet 1.
H. TUTTLE.
MEANS FOR MAKING STRAW BANDS FOR GRAIN BINDERS.
No. 547,698.   Patented Oct. 8, 1895.
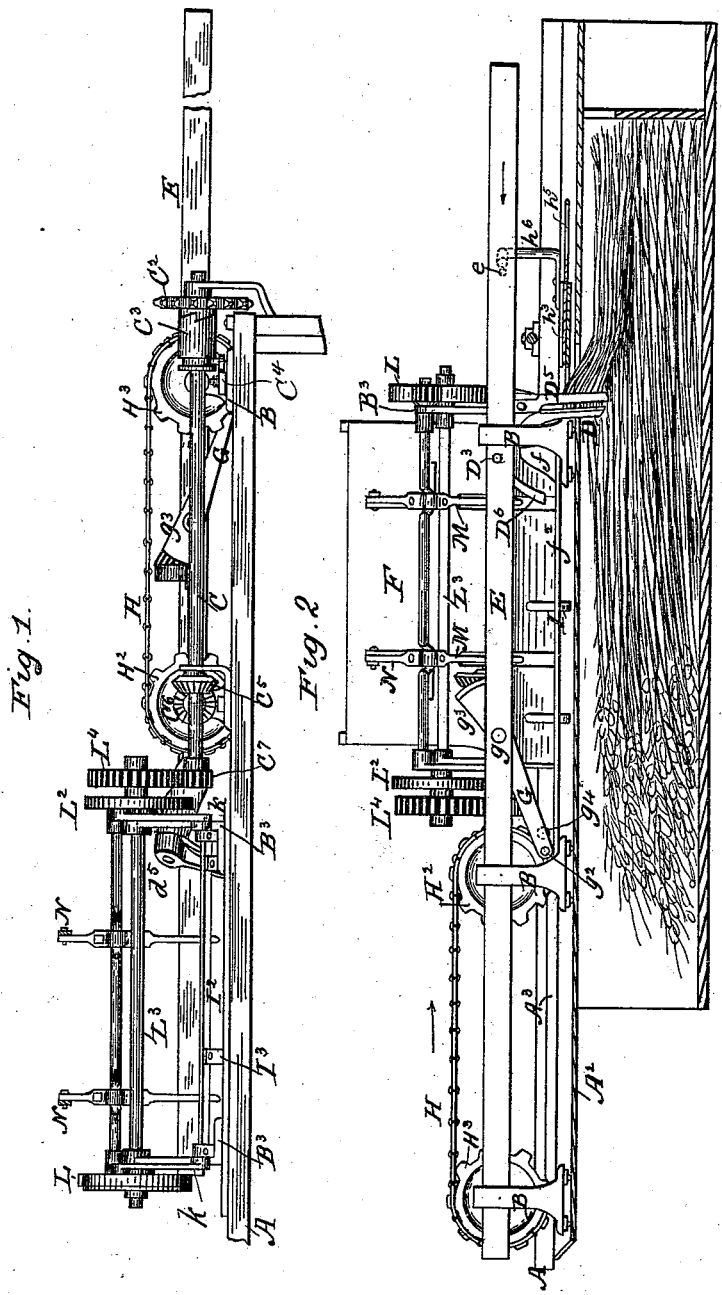
Witnesses:
C. C. Schiller, Jr.
J. J. Masson
Inventor
Hosmer Tuttle
by E. E. Masson
atty.

(No Model.) 3 Sheets—Sheet 2.
H. TUTTLE.
MEANS FOR MAKING STRAW BANDS FOR GRAIN BINDERS.
No. 547,698. Patented Oct. 8, 1895.
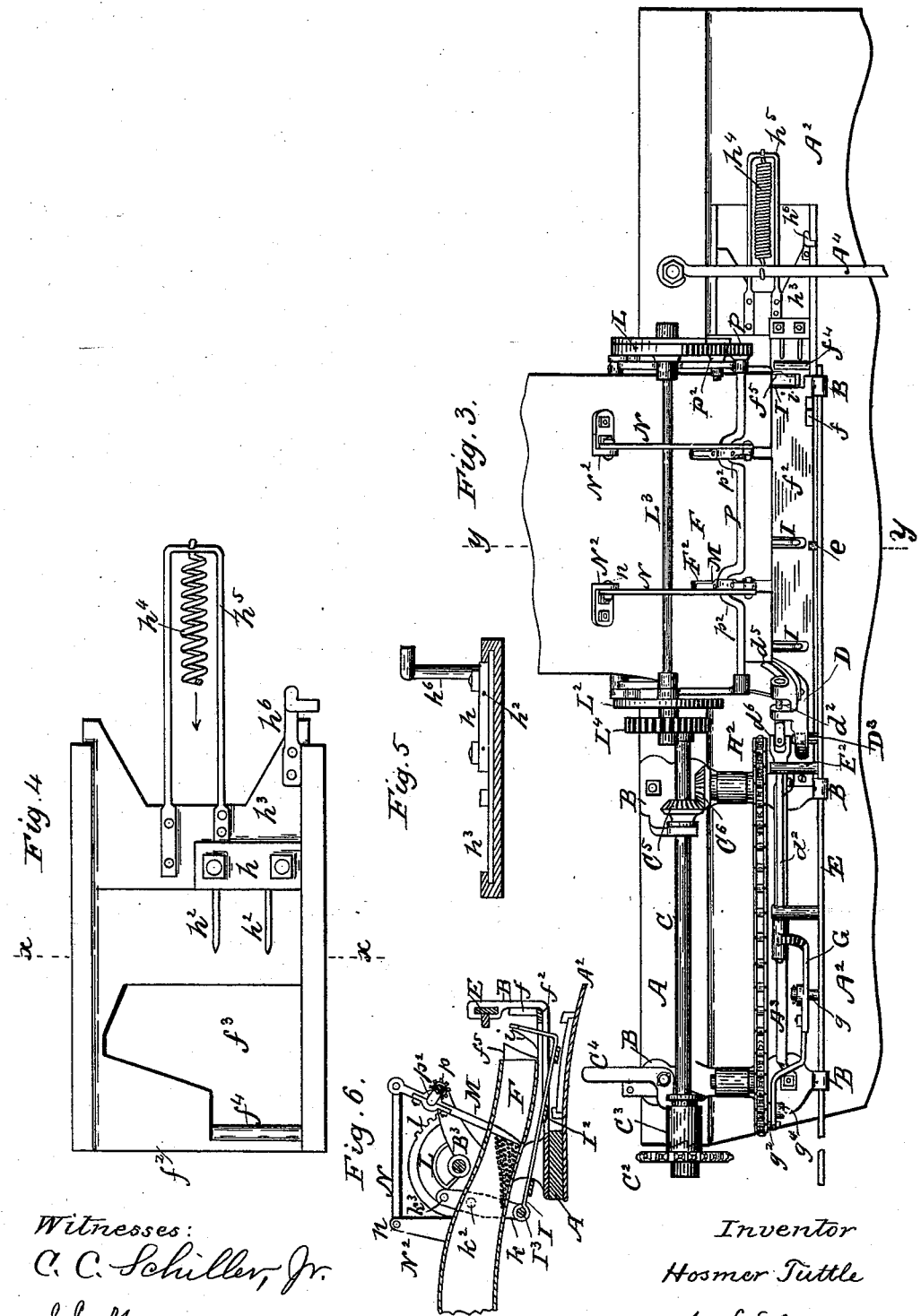
Witnesses:
C. C. Schiller, Jr.
I. J. Masson
Inventor
Hosmer Tuttle
by E. E. Masson
atty.

(No Model.) 3 Sheets—Sheet 3.
H. TUTTLE.
MEANS FOR MAKING STRAW BANDS FOR GRAIN BINDERS.
No. 547,698. Patented Oct. 8, 1895.
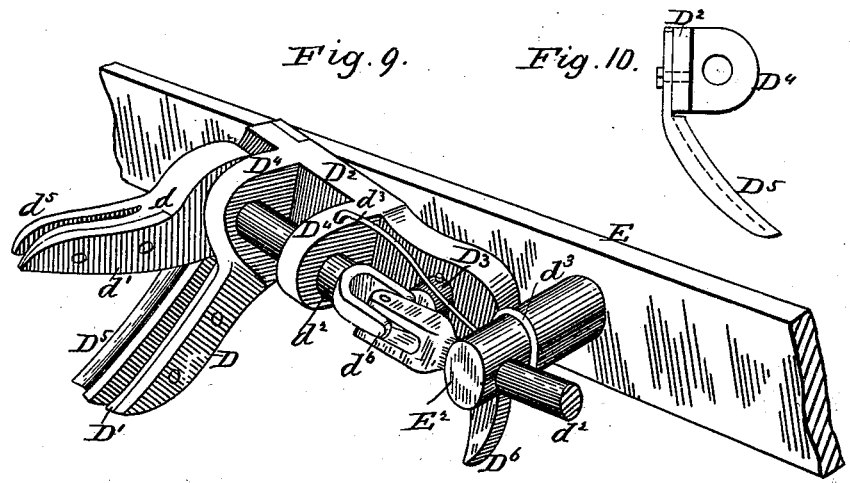
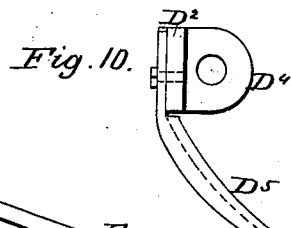
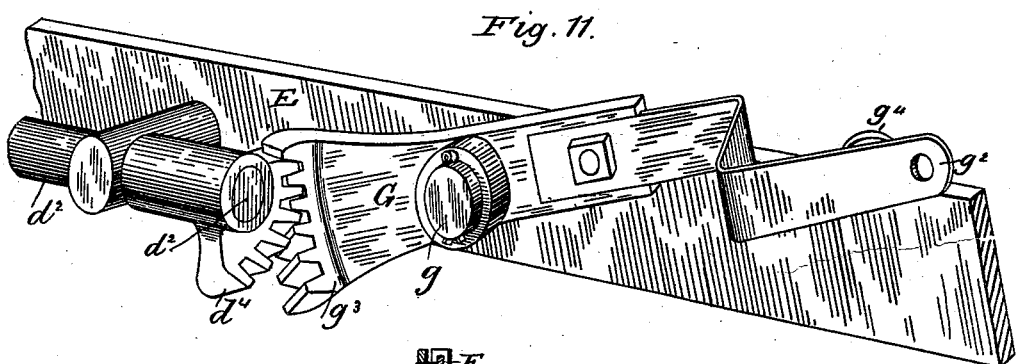
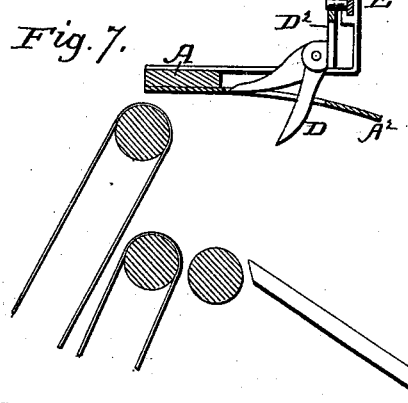
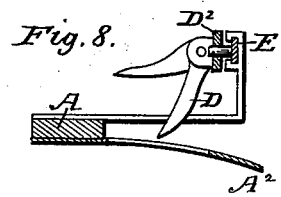
Witnesses:
C. C. Schiller Jr.
I. J. Masson
Inventor
Hosmer Tuttle
by E. E. Masson
atty.

UNITED STATES PATENT OFFICE.

HOSMER TUTTLE, OF CEDAR RAPIDS, IOWA.

MEANS FOR MAKING STRAW BANDS FOR GRAIN-BINDERS.

SPECIFICATION forming part of Letters Patent No. 547,698, dated October 8, 1895.

Application filed May 17, 1890. Serial No. 352,139. (No model.)

*To all whom it may concern:*

Be it known that I, HOSMER TUTTLE, a citizen of the United States, residing at Cedar Rapids, in the county of Linn, State of Iowa, have invented certain new and useful Improvements in Means for Making Straw Bands for Grain-Binders, of which the following is a specification, reference being had therein to the accompanying drawings.

My invention relates to apparatus for feeding the hopper of the straw-band-making mechanism of a harvester from the flow of grain after it is cut and while it passes from the elevator of said harvester to the band-tying mechanism; and the object of my improvement is to provide a simple mechanism for grasping the desired quantity of grain from said flow, cutting off one end of the grasped portion, straightening, combing, and cleaning the same and elevating and advancing the cut portion into the hopper. I attain these objects by the construction illustrated in the accompanying drawings, in which—

Figure 1 is a side view of the mechanism constructed in accordance with my invention, said view being taken from the grain side of the harvester. Fig. 2 is a side view of the mechanism from the opposite side, the binder-platform being shown in transverse vertical section. Fig. 3 is a top view of the same. Fig. 4 is a top view of the upper plate of the top shield, used to direct the grain to the band-tying mechanism, said upper plate having two of its edges turned over to guide the gate carrying the combing device of the mechanism. Fig. 5 is a transverse vertical section of the same on line $xx$ of Fig. 4. Fig. 6 is a transverse vertical section of the mechanism on line $yy$ of Fig. 3. Fig. 7 is a diagram transverse section through the upper end of a harvester, elevator, and binder-platform, the ridge-board, guide-shield, and straw-graspers in a depressed position, one of the branches of the latter extending in the path of the grain. Fig. 8 is a transverse section of the ridge-board, guide-shield, and straw-graspers in an elevated position. Fig. 9 is a perspective view, on a larger scale, of the combined straw cutters and graspers with their operating shaft and carrier-bar. Fig. 10 is a side view of one of the members of the graspers. Fig. 11 is a perspective view of the opposite end of the graspers operating-shaft and lever and their carrier-bar.

In said drawings, A represents the ridge-board of a harvester forming part of its frame. Upon said board are secured castings B to form bearings for the main driving-shaft C. Said castings extend laterally over the top shield $A^2$ and form also bearings for other parts of the mechanism. The main shaft carries loosely upon its outer end a sprocket-wheel $C^2$, having one member of a clutch adapted to engage with a second member $C^3$, retained by a spline upon the shaft C, and a clutch-lever $C^4$ retains said members in engagement. Motion can be given to the sprocket-wheel and its shaft by means of a chain from another sprocket-wheel upon the end of one of the apron-carrying shafts. (Not shown in the drawings.)

The combined straw cutters and graspers consist of the following parts, shown on a large scale in Figs. 9 and 10: A steel blade $D'$, attached to the side of an arm D, projecting laterally from an arm $D^2$, pivoted upon a stud $D^3$, projecting from the side of a reciprocating carrier-bar E, that is carried loosely in bearings B, projecting up from the ridge-board, and a blade $d'$ is attached to the side of an arm $d$, mounted upon one end of a shaft $d^2$, passing through lugs $D^4$ on the side of the arm $D^2$. This forms the cutters. The straw-graspers consist of a finger $D^5$, having its upper end secured to the back of the arm $D^2$. Said upper end is made thin enough to give resilience to the finger to properly grasp the desired amount of straw in connection with the upper finger $d^5$. The lower finger has its face longitudinally grooved to receive the correspondingly-ribbed edge of the upper finger. The latter is parallel with the upper blade-arm $d$, and is mounted therewith upon the end of the shaft $d^2$. To cause the end of the arm $D^2$, carrying the blades and graspers, to be depressed at the proper time, so that the blade D and finger $D^5$ will hang down in the path of the grain flowing from the top of the elevator, the arm $D^2$ carried by the bar E, has at its inner end a pendent lug $D^6$ to strike against a lug $f$, projecting upward from the sheet-iron floor $f^2$ of the funnel F, through which the cut-off butts of the grain are conducted to the reservoir-hopper. To prevent the graspers end of the arm D² from jumping up too high (with the grasped straw) when the bar E is reciprocated rapidly, a light wire spring $d^3$ has one end coiled and retained upon a pin E², projecting from the side of the bar E, and its opposite end bears upon the arm D².

To permit the straw-grasper and cutter-blade to enter into the grain passage under the top shield A², the sheet-iron floor $f^2$ and said shield have an opening, as shown at $f^3$ in Fig. 4, and as soon as the bar E starts in the direction of the arrow on said bar, in Fig. 2, the side of the arm D meets the rounded edge $f^4$ on the side of the opening $f^2$, and the outer end of the lever D² is rocked or pushed upward clear out of the opening $f^3$, and drags the cut straw also out of said opening to a position opposite the funnel F. Said funnel is mounted nearly horizontally above the ridge-board and has slots in its top for the passage of the arms M and slots in its bottom for the passage of the fingers I.

To reciprocate the bar E it has pivoted to its side, at $g$, a lever G, one end of which is connected at $g^2$ with one of the links of the endless chain H, but the opposite end of said lever G is provided with a segmental gear $g^3$ to rotate the shaft $d^2$, carrying the movable arm of the graspers. For this purpose there is secured upon the inner end of said shaft a similar segmental gear $d^4$, which meshes with the segment $g^3$. The depression of the outer end of the lever G from the top of the wheel H² to the position it occupies in Fig. 2 is very rapid, as the chain H is on the curve of the sprocket-wheel H², and this depression causes the blades to cut, and the graspers to seize the straw before the bar E has materially advanced in the direction of the arrow thereon and before they have become elevated through the opening $f^3$. After the end $g^2$ of the lever G has reached the point shown in Fig. 2 the chain H has a straight pull thereon until it reaches the sprocket-wheel H³. When it reaches the latter the end $g^2$ is elevated while traveling around one-half of said wheel, and the graspers are opened and continue in that position until after they have been dipped into the current of grain passing under the top shield A². To retain the graspers in their closed condition while the end $g^2$ of the lever G is drawn from the under side of the sprocket-wheel H² to the wheel H³, a rigid horizontal guide A³ is secured to the castings B to prevent the chain H from slacking up and to guide a roller $g^4$, projecting from the side of the lever G adjacent to its end $g^2$. To rotate the sprocket-wheel H² from the driving-shaft C, the latter carries a bevel-pinion C⁵, which meshes with a similar pinion C⁶ upon the shaft of said sprocket-wheel. To permit the shaft $d^2$ to operate the rotatable blade and grasper $d^5$, said shaft is provided with a universal joint $d^6$, opposite the pivot-stud D³ of the arm D².

To straighten and clean the wisp of straw seized by the graspers from grass that may be mixed with it in its butt-end while it is dragged through the opening $f^3$, Fig. 4, and close to said opening immediately after to prevent any straw from being forced therethrough from the current passing under it, a comb $h$, having horizontal teeth $h^2$, is secured to a sliding gate $h^3$, that is normally closed by a spring $h^4$ having one end secured to a looped rod $h^5$ attached to the rear of said gate and the opposite end to a brace-rod A⁴ of the frame. To again open the gate just before the graspers have reached it, said gate is provided with a short standard $h^6$, having its upper end bent to one side to be in the path of a pin $e$ projecting from the inner side of the reciprocating bar E, and thereby be pushed open. After the wisp of straw has been elevated through the opening $f^3$ it is brought upon the floor of the funnel F, opposite its entrance and with its uneven butt-ends between a stationary blade $f^5$ and a blade $i$ secured to the side of one of the fingers I, used to advance the straw into the entrance of the funnel, Fig. 6. Three of these fingers are shown and they are united together by means of metal straps I². To reciprocate said fingers, they have one end pivoted to a horizontal rod I³ passing under the floor of the funnel and having its ends supported by levers $k$, pivoted at $k^2$ to standing castings B³. To give the necessary oscillatory motion to the fingers I and to the levers $k$, said levers have on their upper ends rollers $k^3$ to travel in grooved cams L and L² that are mounted upon the ends of a shaft L³, located above the funnel F. To give motion to said shaft it carries at one end a gear-wheel L⁴, which meshes with a pinion C⁷ upon the driving-shaft C. After the straw has been received in the funnel F it is pushed along therein toward the reservoir-hopper (not shown) by means of intermittently-operated arms M, which have their lower ends passing through slots F² in the top thereof. While the lower ends of said arms are to have a vertically-circular motion their upper ends are capable of a vertical motion only, as they are pivoted to one end of connecting-rods N, that have their opposite ends pivoted at $n$ to stationary standards N². To give to the arms M the desired motion they are provided with bearings to receive the crank portions P² of a shaft P, having its ends journaled in bearings in the stationary castings B³, and to intermittently revolve said shaft it carries at one end a pinion $p$, which meshes with an idle pinion $p^2$, and the latter with a segmental gear $l$ upon the periphery of the cam L.

Having now fully described my invention, I claim—

1. In combination with the top shield of the grain passage of a harvester, hinged cutter-blades and graspers adapted to automatically descend through an opening in said shield, cut and grasp a wisp of straw thereunder and elevate it substantially as described.

2. In combination with the top shield of the grain passage of a harvester having an opening in said shield, straw cutters and graspers to cut and grasp a wisp of straw thereunder, and a comb alongside of the opening in the shield substantially as described.

3. In combination with the top shield of the grain passage of a harvester having an opening in said shield, straw cutters and graspers to cut and grasp a wisp of straw thereunder and a reciprocated comb alongside of the opening in the shield substantially as described.

4. In combination with the top shield of the grain passage of a harvester having an opening in said shield, straw cutters and graspers to cut and grasp a wisp of straw thereunder and a reciprocated gate and comb substantially as described.

5. In combination with the top shield of the grain passage of a harvester having an opening in said shield, a longitudinally reciprocating bar E; an arm $D^2$ pivoted thereto and carrying a cutter blade and grasper with a pivoted blade and grasper, substantially as described.

6. In a grain binder the combination of the longitudinally reciprocating bar E, an arm $D^2$ pivoted thereto and carrying a cutter blade and grasper, a pivoted blade and grasper, their pivot shaft having a segment gear, and a pivoted lever G provided with a segment gear substantially as described.

7. In a grain binder the combination of a reciprocating bar E, straw graspers pivoted thereto, their shafts provided with segment gear, a lever G pivoted to said bar E and provided with a segment-gear at one end, and an endless chain connection at the other, substantially as described.

8. In a straw band grain binder the combination of a pivoted arm $D^2$ having a rigid blade carrier and blade, and a slightly yielding grasper $D^5$ with a blade carrier and grasper $d^5$ pivoted to the arm $D^2$ substantially as described.

9. In a grain binder the combination of a reciprocating bar E, straw graspers pivoted thereto, their shafts provided with segment-gear, the lever pivoted to said bar E and provided with a segment-gear at one end, an endless chain connection and roller $g^4$ at the other end, and a guide $A^3$ to receive said roller, substantially as described.

10. In a grain binder the combination of the reciprocating bar E, straw graspers carried thereby to advance a wisp of straw upon a slotted platform, fingers passing therethrough, and a funnel opposite said fingers, substantially as described.

11. In a grain binder the combination of the reciprocating bar E straw graspers carried thereby to advance a wisp of straw upon the floor of a funnel, a stationary blade at the side of said funnel and a blade secured to one of the movable fingers, substantially as described.

12. The combination of means for feeding the hopper of the straw band making mechanism of a harvester which consists in a grasper for grasping about the middle of its length a wisp of the grain flowing to the binder platform, cutters for cutting off said wisp into two lengths at that point, means for elevating the separated butt end of the straw by its last cut end and means for pulling the wisp of straw by said cut end into a position to be fed into the hopper substantially as described.

13. The combination of means for feeding the hopper of the straw band making mechanism of a harvester which consists in a grasper for grasping about the middle of its length a wisp of the grain flowing to the binder platform, cutters for cutting off said wisp into two lengths at that point, means for elevating the separated butt end of the straw by its last cut end, means for pulling the wisp of straw by said cut end, and means for combing, cleaning and straightening the straws of said wisp while being pulled into a position to be fed into the hopper substantially as described.

14. The combination of means for feeding the hopper of the straw band making mechanism of a harvester which consists in graspers for grasping about the middle of its length a wisp of grain flowing to the binder platform, cutters for cutting off said wisp into two lengths at that point, means for elevating the separated butt end of the straw by its last cut end, means for pulling the wisp of straw by said cut end, and means for cutting off the butt end of said wisp substantially as described.

15. In combination with a funnel to receive the cut straws to feed the straw band making mechanism of a harvester the fingers I having one end passing through the bottom of said funnel and means as described to reciprocate said fingers longitudinal of the funnel, substantially as described.

In testimony whereof I affix my signature in presence of two witnesses.

HOSMER TUTTLE.

Witnesses:
E. E. MASSON,
C. C. SCHILLER, Jr.